(12) United States Patent
Oh (10) Patent No.: US 11,919,477 B2
(45) Date of Patent: Mar. 5, 2024

(54) SYSTEM AND METHOD FOR CONTROLLING VEHICLE

(71) Applicants: Hyundai Motor Company, Seoul (KR); Kia Corporation, Seoul (KR)

(72) Inventor: Da Ye Oh, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 211 days.

(21) Appl. No.: 17/545,775

(22) Filed: Dec. 8, 2021

(65) Prior Publication Data

US 2022/0410840 A1    Dec. 29, 2022

(30) Foreign Application Priority Data

Jun. 23, 2021 (KR) .................. 10-2021-0081749

(51) Int. Cl.
*B60R 25/00* (2013.01)
*B60R 25/01* (2013.01)
*B60R 25/24* (2013.01)
*B60R 25/31* (2013.01)
*G07C 9/00* (2020.01)

(52) U.S. Cl.
CPC .......... *B60R 25/241* (2013.01); *B60R 25/002* (2013.01); *B60R 25/01* (2013.01); *B60R 25/31* (2013.01); *G07C 9/00309* (2013.01); *G07C 2009/00373* (2013.01)

(58) Field of Classification Search
CPC ..... B60R 25/241; B60R 25/002; B60R 25/01; B60R 25/31; G07C 9/00309; G07C 2009/00373
See application file for complete search history.

(56) References Cited

U.S. PATENT DOCUMENTS

| | | | | |
|---|---|---|---|---|
| 5,959,545 A * | 9/1999 | Lhamon | .............. | G07C 5/008 307/10.3 |
| 8,344,869 B2 * | 1/2013 | Lickfelt | .............. | B60C 23/0452 340/447 |
| 8,421,592 B1 * | 4/2013 | Gunasekara | .......... | B60L 53/63 340/5.74 |
| 8,943,187 B1 * | 1/2015 | Saylor | .............. | G07C 9/00857 709/225 |
| 8,971,857 B2 * | 3/2015 | Nishidai | .............. | H04W 12/06 710/16 |
| 9,218,696 B2 * | 12/2015 | Dumas | .................... | G07C 9/27 |

(Continued)

FOREIGN PATENT DOCUMENTS

| | | |
|---|---|---|
| JP | 2020075669 A | 5/2020 |
| WO | 2020201803 A1 | 10/2020 |

*Primary Examiner* — Steven Lim
*Assistant Examiner* — Son M Tang
(74) *Attorney, Agent, or Firm* — Slater Matsil, LLP

(57) ABSTRACT

An embodiment system includes a vehicle configured to generate a message for informing a tagging status of a portable terminal, in response to the portable terminal entering the tagging status to a door handle, and to control the door handle to be developed over time after the tagging status of the portable terminal is changed to an untagging status, in response to the tagging status of the portable terminal being changed to the untagging status, and a server configured to receive the message for informing the tagging status from the vehicle and transmit the message for informing the tagging status to the portable terminal.

20 Claims, 10 Drawing Sheets

100

(56) References Cited

U.S. PATENT DOCUMENTS

| | | | | |
|---|---|---|---|---|
| 9,501,881 B2 * | 11/2016 | Saeedi | | G07C 9/257 |
| 9,509,496 B2 * | 11/2016 | Kawamura | | G07C 9/00817 |
| 9,666,005 B2 * | 5/2017 | Ellis | | G07C 9/00309 |
| 9,842,448 B1 * | 12/2017 | Lickfelt | | G07C 9/00896 |
| 10,434,988 B2 * | 10/2019 | Gennermann | | B60R 25/241 |
| 2006/0143463 A1 * | 6/2006 | Ikeda | | G07C 9/00817 |
| | | | | 713/182 |
| 2007/0171057 A1 * | 7/2007 | Ogino | | E05B 81/78 |
| | | | | 340/545.7 |
| 2007/0290796 A1 * | 12/2007 | Teshima | | E05B 81/78 |
| | | | | 340/5.72 |
| 2011/0148575 A1 * | 6/2011 | Sobecki | | E05B 5/006 |
| | | | | 292/336.3 |
| 2012/0164989 A1 * | 6/2012 | Xiao | | H04L 67/125 |
| | | | | 715/764 |
| 2012/0254960 A1 * | 10/2012 | Lortz | | H04L 63/104 |
| | | | | 726/3 |
| 2013/0099524 A1 * | 4/2013 | Brown | | E05F 15/605 |
| | | | | 296/146.9 |
| 2013/0200995 A1 * | 8/2013 | Muramatsu | | B60R 25/2045 |
| | | | | 340/5.51 |
| 2015/0039180 A9 * | 2/2015 | Aerts | | E05B 85/103 |
| | | | | 292/336.3 |
| 2015/0057896 A1 * | 2/2015 | Yamane | | B60R 1/062 |
| | | | | 701/49 |
| 2015/0199863 A1 * | 7/2015 | Scoggins | | G07C 9/28 |
| | | | | 340/5.25 |
| 2015/0254913 A1 * | 9/2015 | Obata | | G07C 9/30 |
| | | | | 340/5.72 |
| 2015/0294518 A1 * | 10/2015 | Peplin | | G07C 9/00309 |
| | | | | 340/5.22 |
| 2015/0363986 A1 * | 12/2015 | Hoyos | | G07C 9/00571 |
| | | | | 340/5.61 |
| 2015/0368935 A1 * | 12/2015 | Sugita | | E05B 81/76 |
| | | | | 70/263 |
| 2016/0273247 A1 * | 9/2016 | Fujiwara | | G05G 9/02 |
| 2016/0281397 A1 * | 9/2016 | Park | | E05B 85/103 |
| 2016/0343185 A1 * | 11/2016 | Dumas | | G07C 9/00309 |
| 2017/0050617 A1 * | 2/2017 | Penilla | | G06Q 10/02 |
| 2018/0091930 A1 * | 3/2018 | Jefferies | | G07C 9/00571 |
| 2018/0187461 A1 * | 7/2018 | Mueller | | B60R 25/24 |
| 2018/0363338 A1 * | 12/2018 | Ichinose | | B60R 25/24 |
| 2019/0024421 A1 * | 1/2019 | Cumbo | | B60Q 1/0011 |
| 2019/0169888 A1 * | 6/2019 | Gabriel | | E05B 79/02 |
| 2019/0197468 A1 * | 6/2019 | Endo | | G06Q 10/0832 |
| 2019/0197808 A1 * | 6/2019 | Jinnai | | B60R 25/24 |
| 2020/0070775 A1 | 3/2020 | Linden et al. | | |
| 2020/0102773 A1 * | 4/2020 | Sobecki | | E05B 85/107 |
| 2020/0181940 A1 * | 6/2020 | Fujiwara | | E05B 81/34 |
| 2021/0001806 A1 * | 1/2021 | Kim | | B60R 25/24 |
| 2021/0377733 A1 * | 12/2021 | Hirabayashi | | H04L 63/0492 |
| 2022/0043101 A1 * | 2/2022 | Sanji | | G01S 5/012 |
| 2022/0194188 A1 * | 6/2022 | Toyama | | E05B 85/103 |
| 2022/0195762 A1 * | 6/2022 | Toyama | | E05B 85/16 |

* cited by examiner

SYSTEM AND METHOD FOR CONTROLLING VEHICLE

CROSS-REFERENCE TO RELATED APPLICATIONS

This application claims the benefit of Korean Patent Application No. 10-2021-0081749, filed on Jun. 23, 2021, which application is hereby incorporated herein by reference.

TECHNICAL FIELD

The present disclosure relates to a system and a method for controlling a vehicle.

BACKGROUND

A door handle of a vehicle may be provided on a side surface of a door of the vehicle and may have a pulling structure. Recently, there has been employed an auto flush type door handle which is buried in a side surface of a door such that a user views only a grip line of the door in ordinary times, and is developed (protrudes from the door of the vehicle) when a user having a smart key accesses a vehicle.

Meanwhile, although the door handle of the vehicle of the user is controlled to be opened or locked when the user having the smart key accesses the vehicle, there has been recently developed a technology of controlling the locking or the opening of the vehicle door as the user tags a portable terminal to the vehicle door.

As the auto flush type door handle, which is developed when the user tags the portable terminal to the door handle, is developed with the tagging of the portable terminal, the auto flush type door handle may collide with the portable terminal, thereby causing the portable terminal to be broken.

SUMMARY

Embodiments of the present disclosure can solve problems occurring in the prior art while advantages achieved by the prior art are maintained intact.

An embodiment of the present disclosure provides a system and a method for controlling a vehicle, capable of preventing a portable terminal from colliding with an auto flush type door handle, even if the portable terminal is tagged to the auto flush type door handle such that the auto flush type door handle is developed.

The technical problems to be solved by embodiments of the present inventive concept are not limited to the aforementioned problems, and any other technical problems not mentioned herein will be clearly understood from the following description by those skilled in the art to which the present disclosure pertains.

According to an embodiment of the present disclosure, a system for controlling a vehicle may include the vehicle to generate a message for informing a tagging status of a portable terminal, when the portable terminal enters the tagging status to a door handle, and to control the door handle to be developed over time after the tagging status of the portable terminal is changed to an untagging status, when the portable terminal is changed from the tagging status to the untagging status, and a server to receive the message for informing the tagging status from the vehicle and transmit the message for informing the tagging status to the portable terminal.

The vehicle may determine whether the portable terminal is in the tagging status, depending on whether communication with the portable terminal is made within a specific distance.

The vehicle may generate the message for informing the tagging status, which includes a message informing that tagging of the portable terminal is started, and a message for informing that a remaining time until the door handle is developed is started to be counted, when the portable terminal is in the tagging status to the door handle.

The server may transmit, to the portable terminal, an alarm output signal for allowing the portable terminal to output the message for informing the tagging status in the form of a vibration or the form of a pop-up window.

The portable terminal may output the message for informing the tagging status, in the form of a vibration or the form of a pop-up window, based on the message for informing the tagging status received from the server and the alarm output signal.

The vehicle may control the door handle to be developed, and may transmit, to the server, the message for informing that the door handle is developed, when the remaining time until the door handle is developed is elapsed after the tagging of the portable terminal is started.

The server may transmit, to the portable terminal, an alarm output signal for allowing the portable terminal to output the message for informing that the door handle is developed in the form of a vibration or the form of a pop-up window.

The portable terminal may output the message for informing that the door handle is developed, in the form of a vibration or the form of a pop-up window, based on the message for informing that the door handle is developed received from the server and the alarm output signal.

The vehicle may allow the door handle to be developed to a specific extent, when determining that a specific time is not elapsed, after changing the tagging status of the portable terminal to the untagging status.

The vehicle may allow the door handle to be fully developed, when determining that a specific time is elapsed, after changing the tagging status of the portable terminal to the untagging status.

According to another embodiment of the present disclosure, a method for controlling a vehicle may include generating, by the vehicle, a message for informing a tagging status of a portable terminal, and transmitting, to a server, the message for informing the tagging status, when the portable terminal enters the tagging status to a door handle of the vehicle, and controlling the door handle to be developed over time after the tagging status of the portable terminal is changed to an untagging status, when the tagging status of the portable terminal is changed to the untagging status.

The method may further include determining whether the portable terminal is in the tagging status, depending on whether communication with the portable terminal is made within a specific distance.

The method may include generating the message for informing the tagging status, which includes a message informing that tagging of the portable terminal is started, and a message for informing that a remaining time until the door handle is developed is started to be counted, when the portable terminal is in the tagging status to the door handle.

The server may transmit, to the portable terminal, an alarm output signal for allowing the portable terminal to output the message for informing the tagging status in the form of a vibration or the form of a pop-up window.

The method may include outputting, by the portable terminal, the message for informing the tagging status, in the form of a vibration or the form of a pop-up window, based on the message for informing the tagging status received from the server and the alarm output signal, after transmitting the alarm output signal to the portable terminal.

The method may further include controlling, by the vehicle, the door handle to be developed, and transmitting, to the server, the message for informing that the door handle is developed, when the remaining time until the door handle is developed is elapsed after the tagging of the portable terminal is started.

The server may transmit, to the portable terminal, an alarm output signal for allowing the portable terminal to output the message for informing that the door handle is developed in the form of a vibration or the form of a pop-up window.

The method may further include outputting, by the portable terminal, the message for informing that the door handle is developed, in the form of the vibration or the form of the pop-up window, based on the message for informing that the door handle is developed, which is received from the server, and the alarm output signal, after transmitting the alarm output signal to the portable terminal.

The vehicle may control the door handle to be developed to a specific extent, when determining that a specific time is not elapsed, after changing the tagging status of the portable terminal to the untagging status.

The method may further include controlling, by the vehicle, the door handle to be fully developed, when determining that a specific time is elapsed, after changing the tagging status of the portable terminal to the untagging status.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In addition, in the following description of components according to embodiments of the present disclosure, the terms 'first', 'second', 'A', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
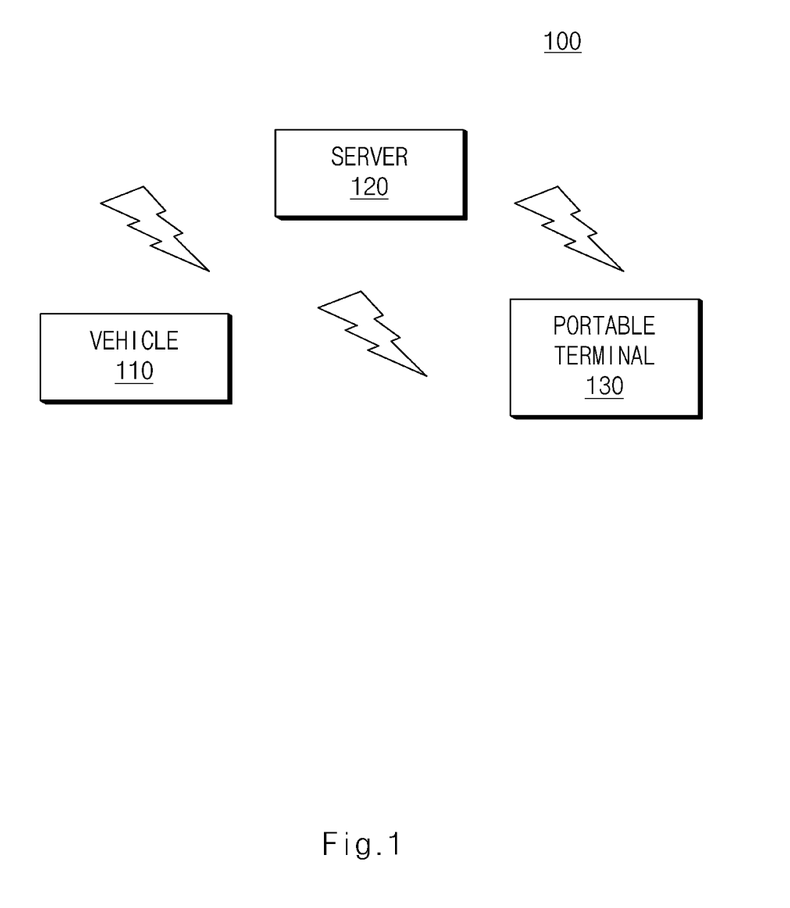
FIG. 1 is a block diagram illustrating the configuration of a system for controlling a vehicle, according to an embodiment of the present disclosure.

FIG. 1 is a block diagram illustrating the configuration of a system for controlling a vehicle, according to an embodiment of the present disclosure.

As illustrated in FIG. 1, a system 100 for controlling a vehicle may include the vehicle no, a server 120, and a portable terminal 130.

When the portable terminal 130 is tagged to a door handle (that is, when the portable terminal 130 is in a tagging status to the door handle), the vehicle no may generate a message for informing the tagging status to the door handle. When the portable terminal 130 is untagged from the door handle (that is, when the tagging status of the portable terminal 130 is changed to an untagging status), the vehicle no may control the door handle to be developed over time after the tagging status of the portable terminal 130 is changed to the untagging status. In this case, the door handle may include an auto flush type door handle developed after being received in a vehicle door. The details of the vehicle no will be described later with reference to FIG. 2.

The server 120 may receive the message for informing the tagging status, from the vehicle no, and may transmit the message for informing the tagging status. The details of the server 120 will be described later with reference to FIG. 4.

When receiving the message for informing the tagging status, the portable terminal 130 may output the message for informing the tagging status in the form of a vibration or a pop-up window such that a user intuitively recognizes the portable terminal 130. The details thereof will be described later with reference to FIG. 4.

Figure 2:
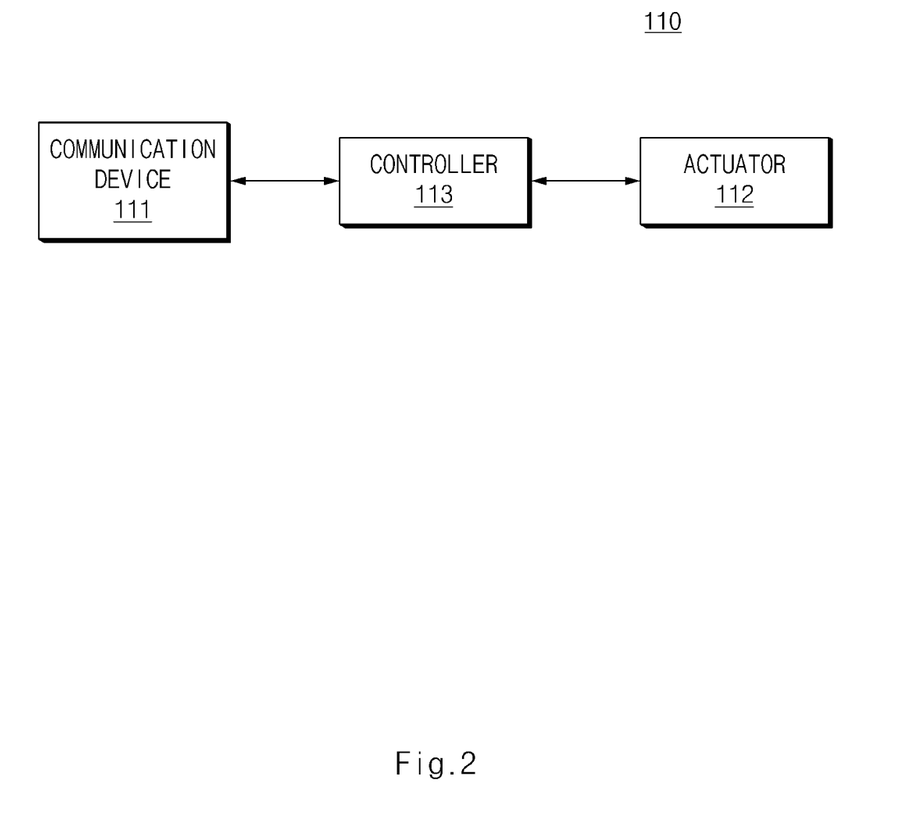
FIG. 2 is a block diagram illustrating the configuration of a vehicle, according to an embodiment of the present disclosure.

FIG. 2 is a block diagram illustrating the configuration of a vehicle, according to an embodiment of the present disclosure.

As illustrated in FIG. 2, the vehicle 110 may include a communication device 111, an actuator 112, and a controller 113.

The communication device 111 may include a first communication device to make communication with the portable terminal 130 within a specific distance from the vehicle 110, and a second communication device to transmit the message for informing the tagging status of the portable terminal 130, to the server 120. In addition, the communication device 111 may include a third communication device to make communication with the portable terminal 130 such that user information is transmitted or received. According to an embodiment, the first communication device may make local-controller area network (CAN) communication with the second communication device, and may make B-CAN communication with the controller 113. According to an embodiment, the first communication device may make near field communication with the portable terminal 130, and the second communication device may make communication with the server 120 through various wireless communication schemes, such as WiFi, Wibro, global system for mobile communication (GSM), code division multiple access (CDMA), wideband code division multiple access (WCDMA), universal mobile telecommunication system (UMTS), or time division multiple access (TDMA), or long term evolution (LTE). The third communication device may make communication with the portable terminal 130 through Bluetooth.

The actuator 112 may develop the door handle in response to a control signal of the controller 113. According to an embodiment, when the controller 113 generates a control signal to develop the door handle to a specific extent, the actuator 112 may develop the door handle to the specific extent (e.g., 50%) in response to the control signal. In addition, when the controller 113 generates a control signal to fully develop the door handle, the actuator 112 may develop the door handle to the extent of 100%, in response to the control signal.

The controller 113 may be implemented with various processing devices, such as a microprocessor embedded therein with a semiconductor chip to operate or execute various instructions, and may control the operation of the vehicle according to an embodiment of the present disclosure.

The controller 113 may determine whether the vehicle door is locked, or may determine whether the door handle is received. The controller 113 may determine whether the portable terminal 130 is in the tagging status, when the vehicle door is locked, and when the door handle is received. The details thereof will be described below with reference to FIG. 3A.

Figure 3A:
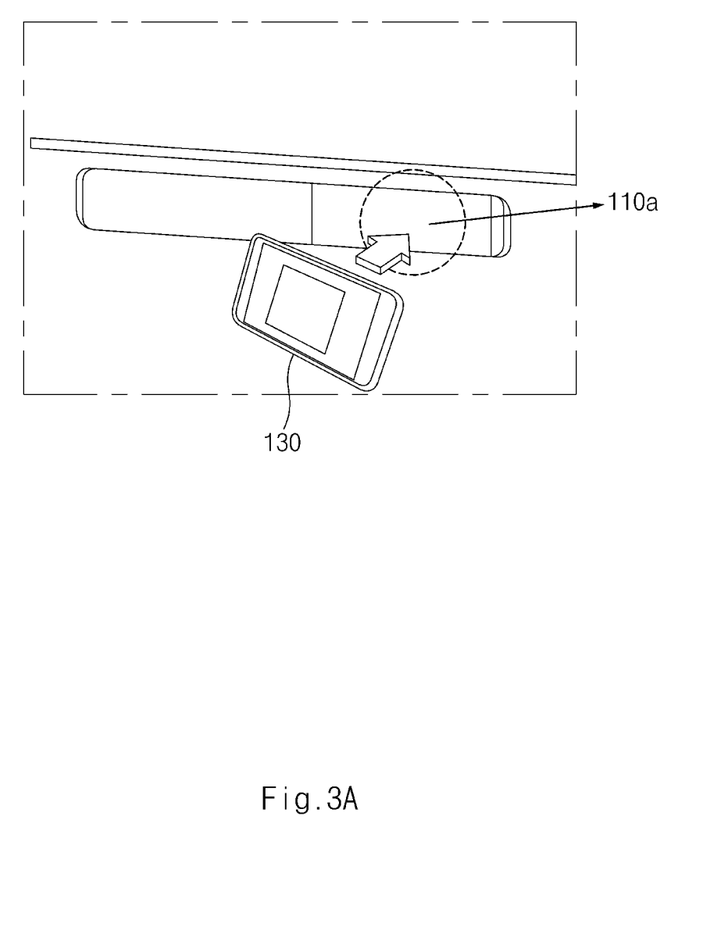
FIG. 3A is a view schematically illustrating a tagging process of a portable terminal, according to an embodiment of the present disclosure.

FIG. 3A is a view schematically illustrating a tagging process of a portable terminal, according to an embodiment of the present disclosure.

As illustrated in FIG. 3A, according to an embodiment, the controller 113 may determine whether the portable terminal 130 is tagged to a door handle 110a, depending on whether the communication with the portable terminal 130 is made within a specific distance (for example, 10 cm). According to an embodiment, the communication with the portable terminal 130 may refer to near field communication (NFC) with an NFC antenna of the portable terminal 130. The controller 113 may determine that the portable terminal 130 is in the tagging status to the door handle 110a, when the communication with the portable terminal 130 is made within the specific distance.

The controller 113 may generate a message for informing a tagging status to the door handle, when the portable terminal 130 is in the tagging status to the door handle 110a. In this case, the message for informing the tagging status may include a message informing that the tagging of the portable terminal 130 is started, and a message for informing that a remaining time until the door handle is developed is started to be counted. In addition, the controller 113 may transmit the message for informing the tagging status, to the server 120.

The controller 113 may determine whether the tagging status of the portable terminal 130 is changed to the untagging status, and whether the tagging of the portable terminal 130 is maintained, after the message for informing the tagging status is transmitted. According to an embodiment, the controller 113 may determine whether the tagging of the portable terminal 130 is maintained, by determining whether the remaining time until the door handle is developed is elapsed after the tagging is started.

The controller 113 may determine whether a specific time (for example, 0.5 seconds) is elapsed after the tagging status is changed to the untagging status, when the tagging status of the portable terminal 130 is changed to the untagging status. In addition, the controller 113 may control an extent that the door handle is developed, depending on whether the specific time is elapsed after the tagging status is changed to the untagging status. The details thereof will be described below with reference to FIGS. 3B and 3C.

Figure 3B:
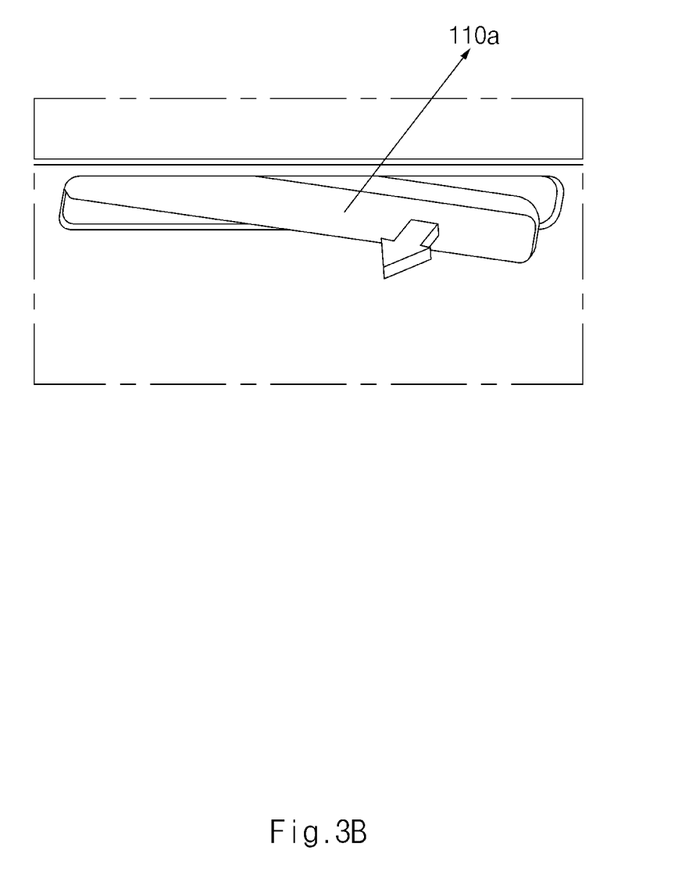
FIG. 3B and FIG. 3C are views schematically illustrating the shape of a door handle as it is developed, according to an embodiment of the present disclosure.
Figure 3C:
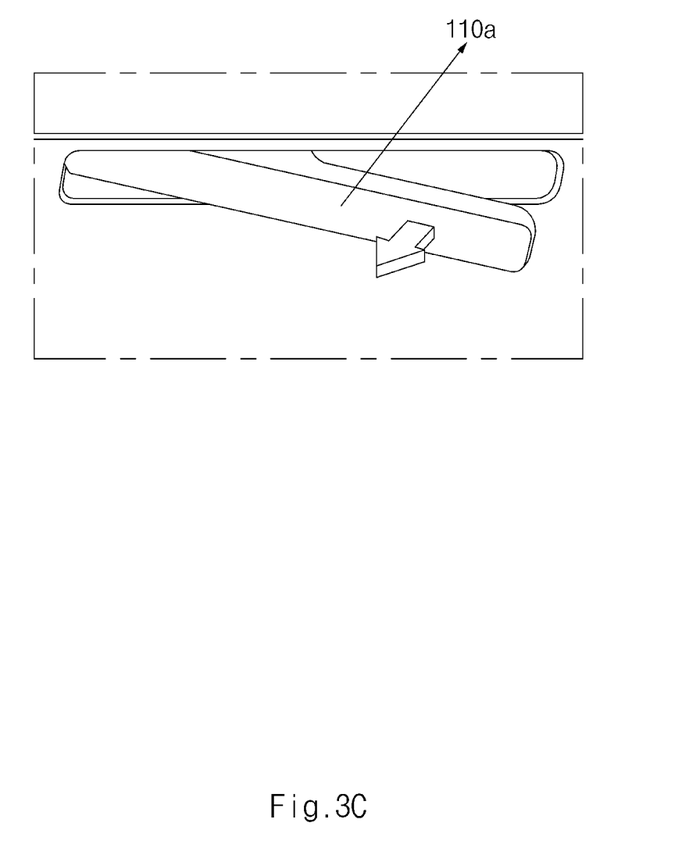

FIG. 3B and FIG. 3C are views schematically illustrating the shape of a door handle as it is developed, according to an embodiment of the present disclosure.

A current time point may be determined as a time point right after the tagging status is changed to the untagging status, when it is determined that the specific time is not elapsed after the tagging status is changed to the untagging status. Right after the tagging status is changed to the untagging status, the portable terminal 130 may be positioned at a distance significantly close to the door handle, and may collide with the door handle, when the door handle is fully developed.

According to an embodiment of the present disclosure, as illustrated in FIG. 3B, the controller 113 may control the door handle to be developed to a specific extent (for example, 50%), when determining that the specific time is not elapsed after the tagging status is changed to the untagging status, such that the portable terminal 130 is prevented from colliding with the door handle right after the tagging status is changed to the untagging status.

Meanwhile, when determining that the specific time is elapsed, after the tagging status is changed to the untagging status, the controller 113 may determine that the portable terminal 130 is not positioned at a distance close to the door handle, and may determine that the portable terminal 130 will not collide with the door handle, even if the door handle is fully developed. Accordingly, as illustrated in FIG. 3C, the controller 113 may control the door handle to be fully developed (to the extent of 100%), when determining that the specific time is elapsed after the tagging status is changed to the untagging status.

The controller 113 may determine whether the tagging of the portable terminal 130 is maintained. According to an embodiment, the controller 113 may determine whether the tagging of the portable terminal 130 is maintained, by determining whether the remaining time until the door handle is developed is elapsed after the tagging is started.

The controller 113 may transmit a message for informing that the door handle is developed, to the server 120, when determining that the remaining time until the door handle is developed is elapsed after the tagging is started. For example, when the remaining time until the door handle is developed after the tagging is started is three seconds, the controller 113 determines that three seconds are elapsed after the tagging of the portable terminal 130 is started, and the controller 113 may control the door handle to be developed while outputting, to the server 120, the message informing that the door handle is developed.

Figure 4:
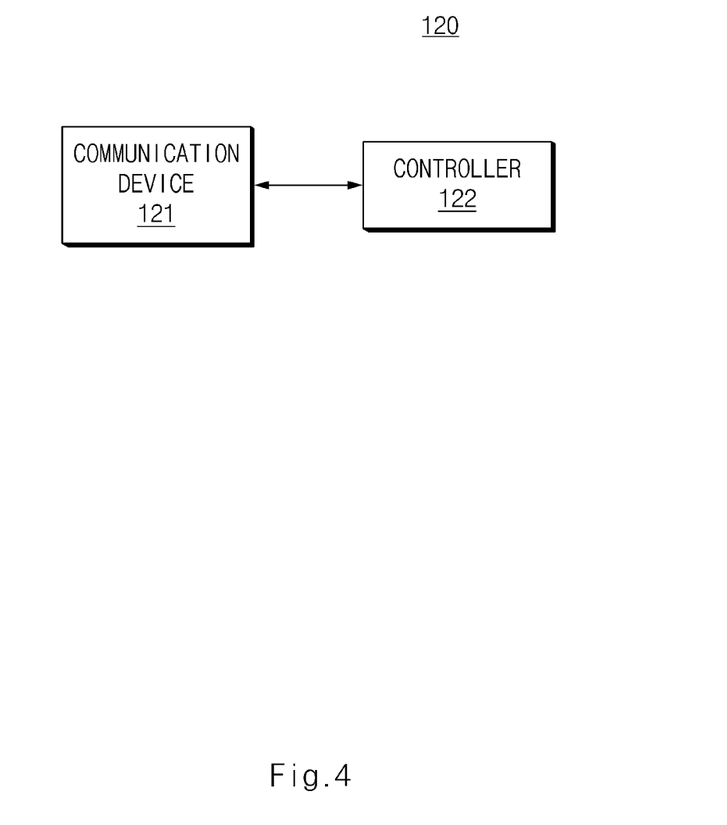
FIG. 4 is a block diagram illustrating the configuration of a server, according to an embodiment of the present disclosure.

FIG. 4 is a block diagram illustrating the configuration of a server, according to an embodiment of the present disclosure.

As illustrated in FIG. 4, the server 120 may include a communication device 121 and a controller 122.

The communication device 121 may make communication with the vehicle 110 and the portable terminal 130. According to an embodiment, the communication device 121 may receive the message for informing the tagging status, or the message for informing that the door handle is developed, from the vehicle no and may transmit, to the portable terminal 130, the message for informing the tagging status or the message for informing that the door handle is developed, which are received from the vehicle no. The communication device 121 may make communication with the vehicle no and the portable terminal 130 through various wireless communication schemes including WiFi, Wibro, GSM, CDMA, WCDMA, UMTS, TDMA, or (LTE).

The controller 122 may be implemented with various processing devices, such as a microprocessor embedded therein with a semiconductor chip to operate or execute various instructions, and may control the operation of the server 120 according to an embodiment of the present disclosure.

The controller 122 may perform a control operation to transmit an alarm output signal to the portable terminal 130, together with the message for informing the tagging status and the message for informing that the door handle is developed, when transmitting, to the portable terminal 130, the message for informing the tagging status and the message for informing that the door handle is developed, which are received from the vehicle no. In this case, the alarm output signal may include a command signal to allow the portable terminal 130 to output the message for informing the tagging status and the message for informing that the door handle is developed, in the form of a vibration and a pop-up window.

Figure 5:
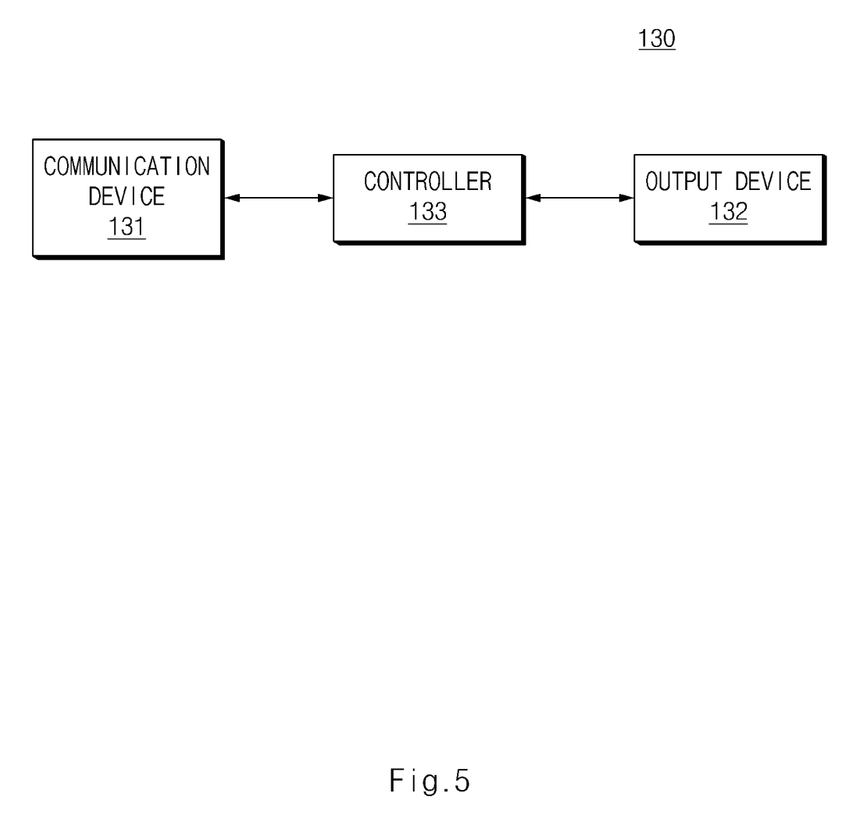
FIG. 5 is a block diagram illustrating the configuration of a portable terminal, according to an embodiment of the present disclosure.

FIG. 5 is a block diagram illustrating the configuration of a portable terminal, according to an embodiment of the present disclosure.

As illustrated in FIG. 5, the portable terminal 130 may include a communication device 131, an output device 132, and a controller 133.

The communication device 131 may receive the message for informing the tagging status and the message for informing that the door handle is developed, from the server 120. The communication device 131 may make communication with the server 120 through various wireless communication schemes including WiFi, Wibro, GSM, CDMA, WCDMA, UMTS, TDMA, or LET. In addition, the communication device 131 may transmit or receive user information by making Bluetooth communication with the vehicle 110.

The output device 132 may output information received from the server 120, in a visible form, an auditory form, or a tactile form. According to an embodiment, when outputting information received from the server 120 in the visible form, the output device 132 may be implemented with a display of a navigation system, or a head up display (HUD). When outputting the received information in the auditory form, the output device 132 may be implemented with a speaker. When outputting information received from the server 120 in the tactile form, the output device 132 may include a vibration outputting device provided in a steering wheel and a seat.

The controller 133 may be implemented with various processing devices, such as a microprocessor embedded therein with a semiconductor chip to operate or execute various instructions, and may control the operation of the portable terminal 130 according to an embodiment of the present disclosure.

When receiving, from the server 120, the alarm output signal together with the message for informing the tagging status and the message for informing that the door handle is developed, the controller 133 may control the output device 132 to output the message for informing the tagging status and the message for informing that the door handle is developed, in the visible form, the auditory form, or the tactile form. According to an embodiment, the controller 133 may allow a user to recognize that the portable terminal 130 is tagged, or that the door handle is developed, through vibration. Alternatively, the controller 133 may allow the user to recognize that the portable terminal 130 is tagged, through a visible image.

Figure 6:
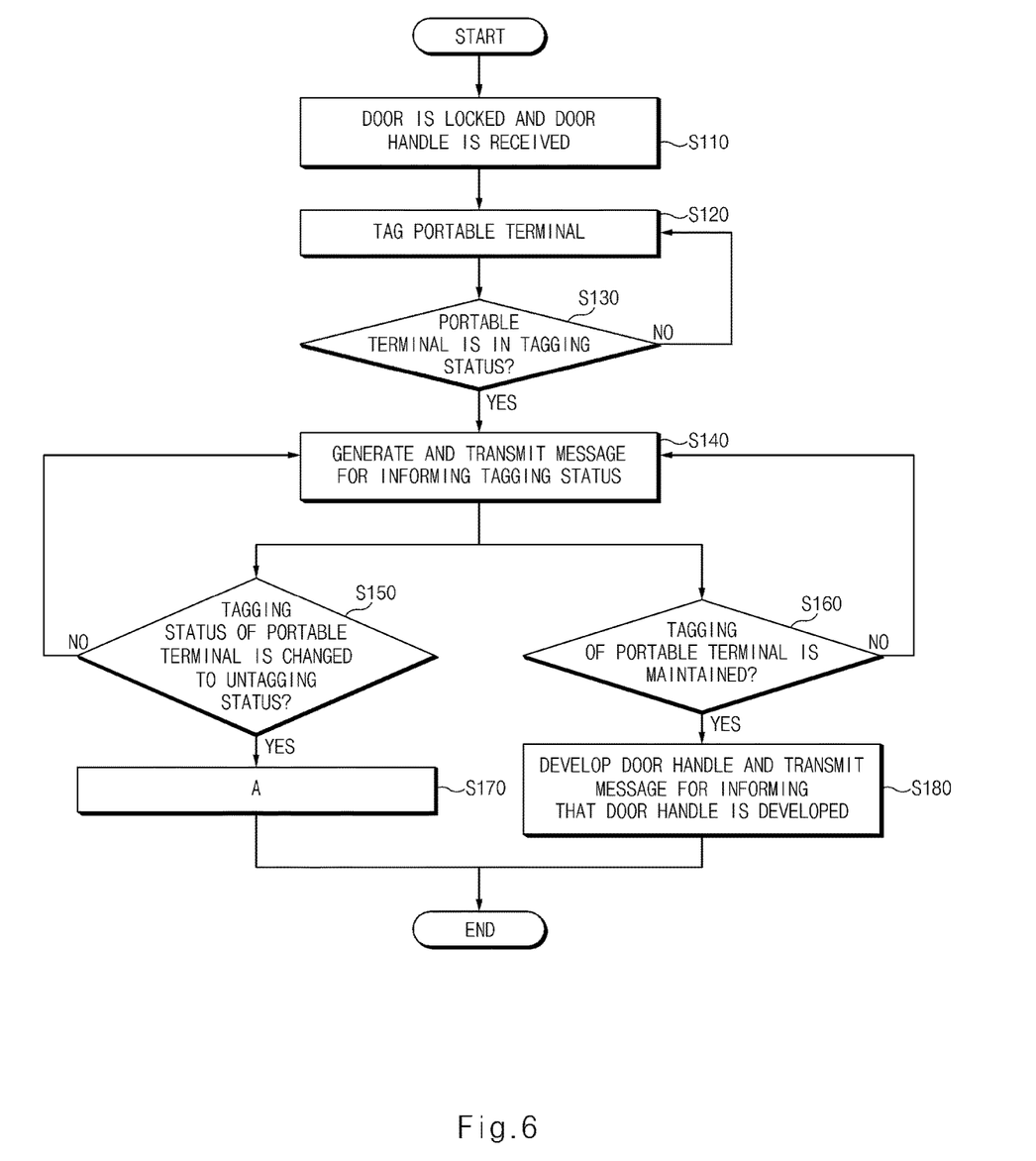
FIGS. 6 and 7 are flowcharts illustrating a method for controlling a vehicle, according to an embodiment of the present disclosure.
Figure 7:
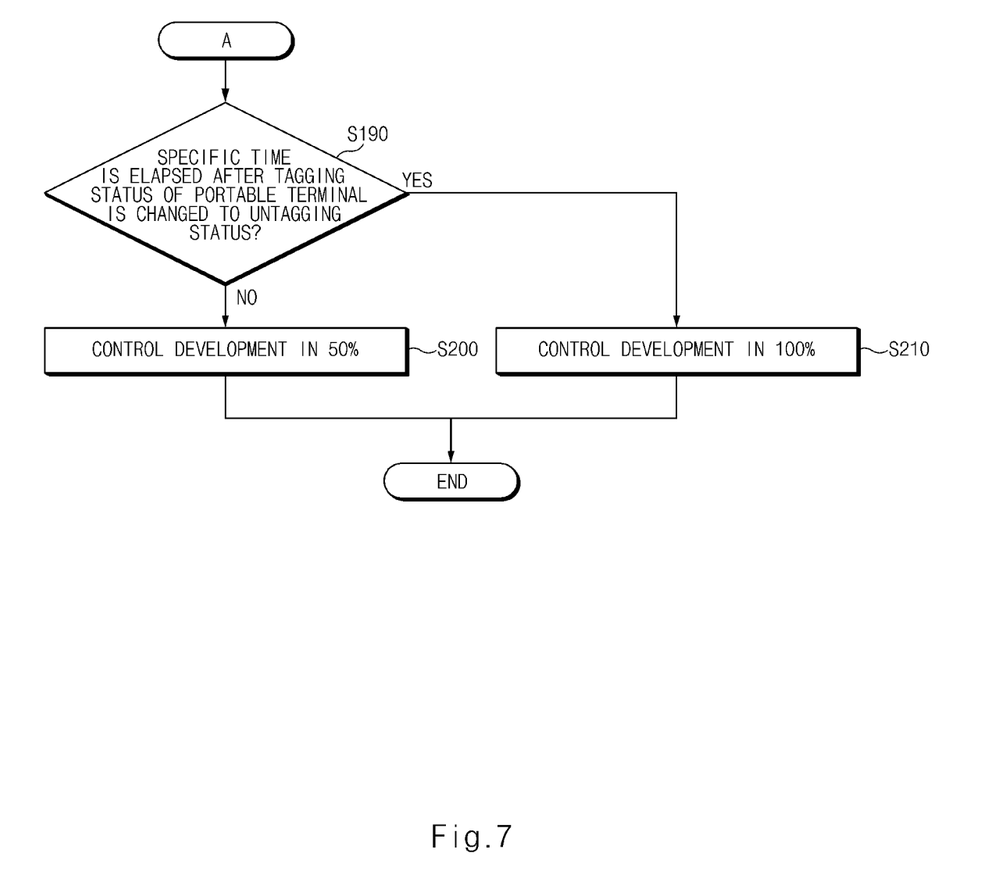

FIGS. 6 and 7 are flowcharts illustrating a method for controlling a vehicle, according to an embodiment of the present disclosure.

As illustrated in FIG. 6, the vehicle no may determine the door is locked and the door handle is received (Silo). When the vehicle 110 determines that the door is locked and that the door handle is received (Silo), a user may tag the portable terminal 130 to the door handle to change the status of the vehicle door to an open status (S120).

The vehicle no may determine whether the portable terminal 130 is in the tagging status (S130).

The vehicle no may generate the message for informing the tagging status, and transmit the message for informing the tagging status to the server 120 (S140), when the portable terminal 130 is in the tagging status in S130 ("YES"). In this case, the message for informing the tagging status may include a message informing that the tagging of the portable terminal 130 is started, and a message for informing that a remaining time until the door handle is developed is started to be counted. The server 120 may transmit, to the portable terminal 130, the message for informing the tagging status in S140, and the portable terminal 130 may output the message for informing the tagging status and may allow the user to intuitively recognize the tagging status of the portable terminal 130. Meanwhile, when the vehicle no determines that the portable terminal 130 is not in the tagging status in S130 ("NO"), the vehicle no performs S120.

The vehicle no may determine whether the tagging status of the portable terminal 130 is changed to the untagging status (S150), and whether the tagging of the portable terminal 130 is maintained (S160), after the message for informing the tagging status is transmitted to the server 120. According to an embodiment, in S160, the controller 113 may determine whether the tagging of the portable terminal 130 is maintained, by determining whether the remaining time until the door handle is developed is elapsed after the tagging is started.

When determining that the tagging status of the portable terminal 130 is changed to the untagging status in S150 ("YES"), the vehicle no performs "A" in S170. The details of "A" will be described below with reference to FIG. 7. Meanwhile, when determining that the tagging status of the portable terminal 130 is not changed to the untagging status in S15o ("NO"), the vehicle no performs S140.

In S160, the vehicle 110 may determine whether the remaining time until the door handle is developed is elapsed after the tagging of the portable terminal 130. When determining that the remaining time until the door handle is developed is elapsed after the tagging of the portable terminal 130 is started, the vehicle no may determine that the tagging status is maintained ("YES"), while transmitting, to the server 120, the message for informing that the door handle is developed (S180). The server 120 may transmit, to the portable terminal 130, the message for informing that the door handle is developed in S180, and the portable terminal 130 may output the message for informing that the door handle is developed such that the user intuitively recognizes that the door handle is developed.

As illustrated in FIG. 7, the vehicle no may determine whether a specific time (for example, 0.5 seconds) is elapsed after the tagging status of the portable terminal 130 is changed to the untagging status (S190). In addition, the controller 113 may control an extent that the door handle is developed, depending on whether the specific time is elapsed after the tagging status is changed to the untagging status.

When determining that the specific time is not elapsed after the tagging status is changed to the untagging status in S190 ("NO"), the vehicle no may determine that a current time point is a time point right after the tagging status is changed to the untagging status. Right after the tagging status is changed to the untagging status, the portable terminal 130 may be positioned at a distance significantly close to the door handle, and may collide with the door handle, when the door handle is fully developed.

According to an embodiment of the present disclosure, as illustrated in FIG. 3B, the vehicle 110 may control the door handle to be developed to a specific extent (for example, 50%) (S200), when determining that the specific time is not elapsed after the tagging status is changed to the untagging status, such that the portable terminal 130 is prevented from colliding with the door handle right after the tagging status is changed to the untagging status.

Meanwhile, when determining that the specific time is elapsed after the tagging status is changed to the untagging status in S190 ("YES"), the controller 113 may determine that the portable terminal 130 is not positioned at a distance close to the door handle, and may determine that the portable terminal 130 does not collide with the door handle, even if the door handle is fully developed. Accordingly, the vehicle 110 may control the door handle to be fully developed (to the extent of 100%), when determining that the specific time is elapsed after the tagging status is changed to the untagging status.

Figure 8:
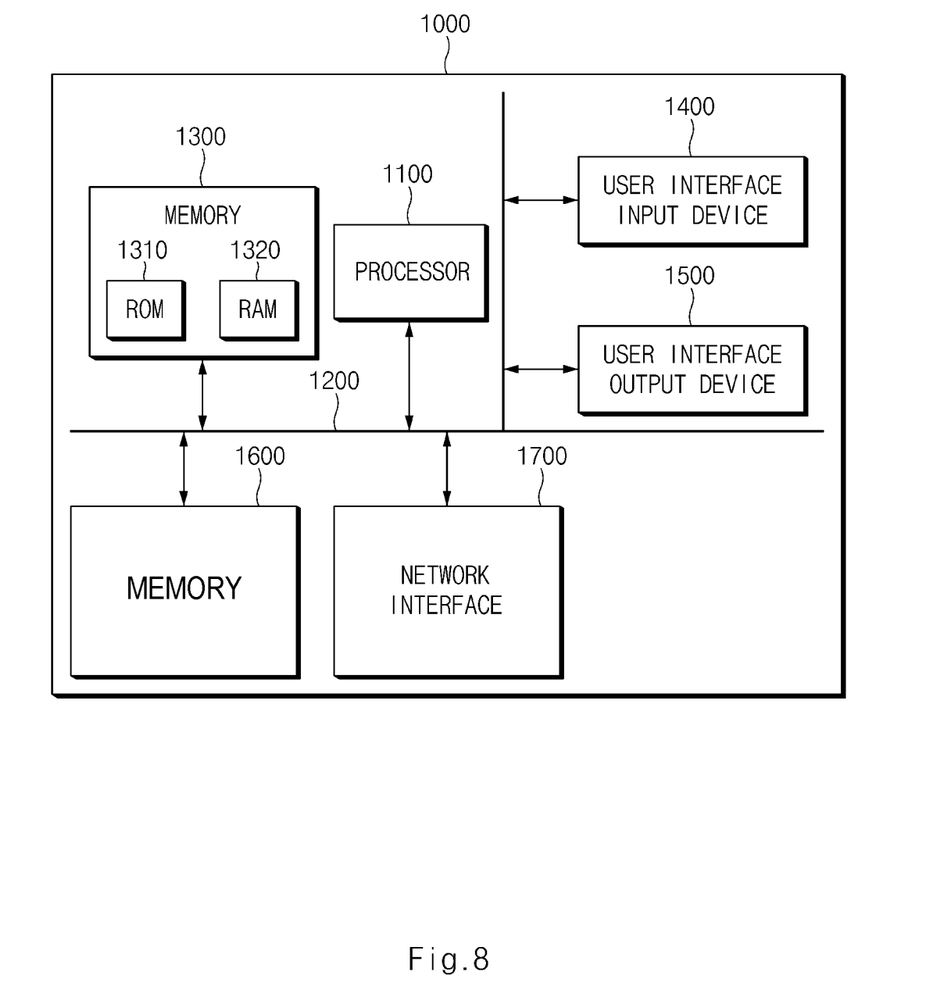
FIG. 8 is a block diagram illustrating a computing system to execute the method, according to an embodiment of the present disclosure.

FIG. 8 is a block diagram illustrating a computing system to execute the method according to an embodiment of the present disclosure.

Referring to FIG. 8, a computing system woo may include at least one processor 1100, a memory 1300, a user interface input device 1400, a user interface output device 1500, a memory, i.e., a storage, 1600, and a network interface 1700, which are connected with each other via a bus 1200.

The processor 1100 may be a central processing unit (CPU) or a semiconductor device for processing instructions stored in the memory 1300 and/or the memory 1600. Each of the memory 1300 and the memory 1600 may include various types of volatile or non-volatile storage media. For example, the memory 1300 may include a read only memory (ROM; see 1310) and a random access memory (RAM; see 1320).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the memory 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to an embodiment of the present disclosure, in the system and the method for controlling the vehicle, the portable terminal is prevented from colliding with an auto flush type door handle, even if the portable terminal is tagged to the auto flush type door handle such that the door handle is developed, thereby increasing the user convenience.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but are provided only for the illustrative purpose. The scope of protection of the present disclosure should be construed by the attached claims, and all equivalents thereof should be construed as being included within the scope of the present disclosure.

What is claimed is:

1. A system comprising:
   a vehicle configured to generate a message for informing a tagging status of a portable terminal, in response to the portable terminal entering the tagging status to a door handle, and to control the door handle to be developed over time after the tagging status of the portable terminal is changed to an untagging status, in response to the tagging status of the portable terminal being changed to the untagging status; and
   a server configured to receive the message for informing the tagging status from the vehicle and transmit the message for informing the tagging status to the portable terminal,
   wherein the vehicle is configured to generate the message for informing the tagging status, which includes a message informing that tagging of the portable terminal is started, and a message for informing that a remaining time until the door handle is developed is started to be counted, in response to the portable terminal being in the tagging status to the door handle,
   wherein controlling the door handle to be developed includes controlling the door handle to be protruding from the door of the vehicle.

2. The system of claim 1, wherein the vehicle is configured to determine whether the portable terminal is in the tagging status based on whether communication with the portable terminal is made within a specific distance.

3. The system of claim 1, wherein the vehicle is configured to control the door handle to be developed, and to transmit, to the server, a message for informing that the door handle is developed, in response to the remaining time until the door handle is developed elapsing after the tagging of the portable terminal is started.

4. The system of claim 3, wherein the server is configured to transmit, to the portable terminal, an alarm output signal configured to allow the portable terminal to output the message for informing that the door handle is developed in a form of a vibration or a form of a pop-up window.

5. The system of claim 4, wherein the portable terminal is configured to output the message for informing that the door handle is developed, in the form of the vibration or the form of the pop-up window, based on the message for informing that the door handle is developed received from the server and the alarm output signal.

6. The system of claim 1, wherein the server is configured to transmit, to the portable terminal, an alarm output signal for allowing the portable terminal to output the message for informing the tagging status in a form of a vibration or a form of a pop-up window.

7. The system of claim 6, wherein the portable terminal is configured to output the message for informing the tagging status, in the form of the vibration or the form of the pop-up window, based on the message for informing the tagging status received from the server and the alarm output signal.

8. The system of claim 1, wherein the vehicle is configured to allow the door handle to be developed to a specific extent less than a fully developed extent in response to a determination that a specific time has not elapsed after changing the tagging status of the portable terminal to the untagging status.

9. The system of claim 1, wherein the vehicle is configured to allow the door handle to be fully developed in response to a determination that a specific time has elapsed after changing the tagging status of the portable terminal to the untagging status.

10. A method for controlling a vehicle, the method comprising:
    generating a message for informing a tagging status of a portable terminal;
    transmitting the message for informing the tagging status in response to the portable terminal entering the tagging status to a door handle of the vehicle; and
    controlling the door handle to be developed over time after the tagging status of the portable terminal is changed to an untagging status in response to the tagging status of the portable terminal being changed to the untagging status,
    wherein generating the message for informing the tagging status includes a message informing that tagging of the portable terminal is started, and a message for informing that a remaining time until the door handle is developed is started to be counted, in response to the portable terminal being in the tagging status to the door handle,
    wherein controlling the door handle to be developed includes controlling the door handle to be protruding from the door of the vehicle.

11. The method of claim 10, further comprising determining whether the portable terminal is in the tagging status based on whether communication with the portable terminal is made within a specific distance.

12. The method of claim 10, further comprising:
    controlling the door handle to be developed; and
    transmitting a message for informing that the door handle is developed, in response to the remaining time until the door handle is developed elapsing after the tagging of the portable terminal is started.

13. The method of claim 12, further comprising transmitting an alarm output signal for allowing the portable terminal to output the message for informing that the door handle is developed in a form of a vibration or a form of a pop-up window.

14. The method of claim 13, further comprising outputting the message for informing that the door handle is developed, in the form of the vibration or the form of the pop-up window, based on the message for informing that the door handle is developed and the alarm output signal, after transmitting the alarm output signal.

15. The method of claim 10, further comprising transmitting an alarm output signal for allowing the portable terminal to output the message for informing the tagging status in a form of a vibration or a form of a pop-up window.

16. The method of claim 15, further comprising outputting the message for informing the tagging status, in the form of the vibration or the form of the pop-up window, based on the message for informing the tagging status and the alarm output signal, after transmitting the alarm output signal.

17. The method of claim 10, further comprising controlling the door handle to be developed to a specific extent less than a fully developed extent in response to determining that a specific time has not elapsed after the tagging status of the portable terminal is changed to the untagging status.

18. The method of claim 10, further comprising controlling the door handle to be fully developed in response to a determination that a specific time has elapsed after the tagging status of the portable terminal is changed to the untagging status.

19. A non-transitory computer readable medium with instructions stored thereon, wherein the instructions, when executed by a processor, enable the processors to perform:
    generating a message for informing a tagging status of a portable terminal;
    transmitting the message for informing the tagging status in response to the portable terminal entering the tagging status to a door handle of a vehicle; and
    controlling the door handle to be developed over time after the tagging status of the portable terminal is changed to an untagging status in response to the tagging status of the portable terminal being changed to the untagging status,
    wherein generating the message for informing the tagging status includes a message informing that tagging of the portable terminal is started, and a message for informing that a remaining time until the door handle is developed is started to be counted, in response to the portable terminal being in the tagging status to the door handle,
    wherein controlling the door handle to be developed includes controlling the door handle to be protruding from the door of the vehicle.

20. The non-transitory computer readable medium of claim 19, wherein the instructions, when executed by the processor, further enable the processor to perform:
    determining whether the portable terminal is in the tagging status based on whether communication with the portable terminal is made within a specific distance.

* * * * *